(12) United States Patent
Gershon

(10) Patent No.: US 6,430,266 B2
(45) Date of Patent: *Aug. 6, 2002

(54) APPARATUS AND METHOD FOR EXAMINING AND STANDARDIZING LINE CONNECTIONS

(75) Inventor: Eugen Gershon, San Jose, CA (US)

(73) Assignee: Legerity, Inc., Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/362,181

(22) Filed: Jul. 28, 1999

(51) Int. Cl.[7] .......................... H04M 1/24; H04M 3/08; H04M 3/22

(52) U.S. Cl. .......................... 379/22; 379/1.01; 379/12; 379/24; 379/27.06; 379/29.02

(58) Field of Search ............................ 379/1, 6, 12, 21, 379/22, 23, 24, 27, 28, 29, 30, 32, 34

(56) References Cited

U.S. PATENT DOCUMENTS

| | | | |
|---|---|---|---|
| 5,436,968 A | | 7/1995 | Parker, Jr. et al. .......... 379/398 |
| 5,550,894 A | * | 8/1996 | Charland ........................ 379/2 |
| 6,002,671 A | * | 12/1999 | Kahkoska et al. ............. 379/27 |
| 6,014,425 A | * | 1/2000 | Bingel et al. .................. 379/27 |
| 6,185,280 B1 | * | 2/2001 | Jarboe et al. ................... 379/3 |

FOREIGN PATENT DOCUMENTS

| | | | |
|---|---|---|---|
| JP | 01136454 | 5/1989 | ............ H04M/3/26 |
| WO | WO 99/34588 | 7/1999 | .......... H04M/11/00 |

OTHER PUBLICATIONS

BellCore Sapphyre Loop Service, Charles Woloszynski, 1998.* xDSL Loop Qualification and Testing, Walter Goralski, Hill Associates, May 1999.*

Outside Plant, Testing ADSL: The easier, the better, Alan Stewart, America's Network, Dec. 5, 1998.*

* cited by examiner

*Primary Examiner*—Binh Tieu
(74) *Attorney, Agent, or Firm*—Williams, Morgan & Amerson

(57) ABSTRACT

An apparatus and a method a method for testing, configuring, and evaluating a transmission line. The method receives a set of command and data signals through an input/output interface and processes the command and data signals from the input/output interface for controlling at least one relay. The method also activates at least one switch for testing and improving a transmission signal line using the relay and testing and emulating the transmission signal line based upon the activated switch. The method also configures the transmission signal line based upon the testing and emulating.

57 Claims, 10 Drawing Sheets

APPARATUS AND METHOD FOR EXAMINING AND STANDARDIZING LINE CONNECTIONS

BACKGROUND OF THE INVENTION

1. Field of the Invention

This invention relates generally to testing and improving signal lines, and, more particularly, to evaluating the quality of signal lines and standardizing the line connection.

2. Description of the Related Art

The testing and maintenance of signal lines, particularly transmission lines in telephone systems, is has become necessary and costly task. In telephony, it is common practice to transmit signals between a subscriber station and a central switching office via a two-wire bi-directional communication channel. The length of the transmission lines that carry telephone signals between the central switching office and the subscriber station can be quite large. As faster signals have been added to carry data over telephone lines, the quality of the transmission line has become critical, creating the need for periodic evaluation and adjustments.

Transmission lines generally have a natural characteristic impedance determined by cable construction and geometry. To drive a signal on a subscriber line while minimizing signal reflection from the far end of the subscriber line and maximizing the signal power entering the line, it is desirable to match the characteristic impedance of the transmission line with a termination at each end.

The Plain Old Telephone Service (POTS), which was designed primarily for voice communication, provides an inadequate data transmission rate for many modem applications. To meet the demand for high-speed communication, designers sought innovative and cost-effective solutions that took advantage of the existing network infrastructure. Several technological advancements were proposed in the telecommunications industry that made use of the existing network of telephone wires. The most promising of these technologies is the xDSL technology.

xDSL is making the existing network of telephone lines more robust and versatile. Once considered virtually unusable for broadband communications, an ordinary twisted pair equipped with DSL interfaces can transmit videos, television, and high-speed data. The fact that more than six hundred million telephone lines exist around the world is a compelling reason that these lines will serve as the primary transmission conduits for at least several more decades. Because DSL utilizes telephone wiring already installed in virtually every home and business in the world, it has been embraced by many as one of the more promising and viable options.

There are now at least four popular versions of DSL technology, namely Asymmetrical Digital Subscriber Line (ADSL), Integrated Services Digital Network Digital Subscriber Line (IDSL), Very High-Speed Digital Subscriber Line (VDSL), and Symmetric Digital Subscriber Line (SDSL). Although each technology is generally directed at different types of users, they all share certain characteristics. For example, all four DSL systems utilize the existing, ubiquitous telephone wiring infrastructure, deliver greater bandwidth, and operate by employing special digital signal processing. Because the aforementioned technologies are well known in the art, they will not be described in detail herein.

DSL technologies and Plain Old Telephone System can co-exist in one line (e.g., also referred to as "subscriber line"). Traditional analog voice band interfaces use the same frequency band, 0–4 Kilohertz (KHz), as telephone service, thereby preventing concurrent voice and data use. A DSL interface, on the other hand, operates at frequencies above the voice channels, from 100 KHz to 1.1 Megahertz (MHz). Thus, a single DSL line is capable of offering simultaneous channels for voice and data.

DSL systems use digital signal processing (DSP) to increase throughput and signal quality through common copper telephone wire. It provides a downstream data transfer rate from the DSL Point-of-Presence (POP) to the subscriber location at speeds of up to 1.5 Megabits per second (Mbps). The transfer rate of 1.5 Mbps, for instance, is fifty times faster than a conventional 28.8 kilobits per second (Kbps).

Telephone line characteristics can vary significantly when certain telecommunication equipment, such as telephones, facsimile machines, and xDSL transceivers, are connected to the line. It is desirable to perform many line tests on the telephone line for properly maintaining transmission lines. However, implementation of these tests can become manual-intensive and increase the costs of transmission line evaluation and maintenance. The industry lacks an efficient and automated method of performing line tests, particularly from a remote location. Furthermore, automated termination of nodes on telephone lines would dramatically improve the efficiency and quality of signal transmission.

Another use of the telephone system is the application of high frequency signals, approximately 7.5 MHz, being placed on the transmission lines to facilitate local network connectivity for multiple electronic products within a subscriber station. When employing high-frequency network applications on the transmission lines, an evaluation of the wiring within a subscriber line is desirable. Currently, the industry lacks an efficient method of checking the integrity of the transmission line and configuring the transmission line for the purpose of local networking.

The present invention is directed to overcoming, or at least reducing the effects of, one or more of the problems set forth above.

SUMMARY OF THE INVENTION

According to one aspect of the present invention, a method for testing, configuring, and evaluating a transmission line is presented. The method includes receiving a set of command and data signals through an input/output interface and processing the command and data signals from the input/output interface for controlling at least one relay. The method also includes activating at least one switch for testing and improving a transmission signal line using the relay and includes testing and emulating the transmission signal line based upon the activated switch. The method also includes configuring the transmission signal line based upon the testing and emulating.

According to another aspect of the present invention, an apparatus for testing, configuring, and evaluating a transmission line is provided. The apparatus includes means for receiving a set of command and data signals through an input/output interface and means for processing the command and data signals from the input/output interface for controlling a set of relays. The apparatus also includes means for activating one or more switches for testing and improving a transmission signal line using the relays and means for testing and emulating the transmission signal line based upon the activated switches. The apparatus also includes means for configuring the transmission signal line based upon a result of the means for testing and emulating.

According to still another aspect of the present invention, an apparatus for improving transmission quality on a transmission line by testing or evaluating and configuring the transmission line is provided. The apparatus includes a Universal Telephone Equipment Terminator (UTET) capable of implementing at least one of a test and an emulation, as well as a configuration on the transmission line. The configuration is performed in response to the test or the emulation. The UTET includes an input/output interface capable of receiving data and command signals and a micro-controller electrically coupled to the input/output interface and at least one relay electrically coupled to the micro-controller. The UTET also includes, both electrically coupled to the relay and the transmission line, at least one off-hook impedance emulation and measurement device and at least one on-hook impedance emulation and measurement device. The UTET also includes, both electrically coupled to the relay and the transmission line, at least one line-voltage measurement device, at least one resistive load termination switch and at least one active impedance termination switch. The micro-controller is adapted to receive and process the data and command signals from the input/output interface. The relay is adapted to activate a plurality of signal switches in response to a set of commands from the micro-controller. The off-hook impedance emulation and measurement device, the resistive load termination switch, the active impedance termination switch, the on-hook impedance emulation and measurement device, and the line-voltage measurement device are each adapted to be activated by the relay.

In yet another aspect of the present invention, another apparatus for testing, evaluating, and configuring a transmission line to improve transmission quality on the transmission line is provided. The apparatus includes a Universal Telephone Equipment Terminator (UTET) capable of implementing at least two of a test, a configuration, and an emulation on the transmission line. The apparatus is configured to communicate status and test signals on the transmission line to a second apparatus. The configuration is performed in response to the test or the emulation. The UTET includes an input/output interface capable of receiving data and command signals and a micro-controller electrically coupled to the input/output interface. The micro-controller is adapted to receive and process the data and command signals from the input/output interface. The UTET also includes at least one relay electrically coupled to the micro-controller. The relay is adapted to activate a plurality of signal switches in response to a set of commands from the micro-controller. The UTET also includes, electrically coupled to the relay and the transmission line, at least one off-hook impedance emulation and measurement device and at least one onhook impedance emulation and measurement device. The off-hook impedance emulation and measurement device and the on-hook impedance emulation and measurement device are both adapted to be activated by the relay. The UTET also includes, electrically coupled to the relay and the transmission line, at least one line-voltage measurement device and at least one resistive load termination switch. The line-voltage measurement device and the resistive load termination switch are both adapted to be activated by the relay. The UTET also includes at least one active impedance termination switch electrically coupled to the relay and the transmission line. The active impedance termination switch is also adapted to be activated by the relay.

BRIEF DESCRIPTION OF THE DRAWINGS

The invention may be understood by reference to the following description taken in conjunction with the accompanying drawings, in which like reference numerals identify like elements, and in which.

Figure 1:
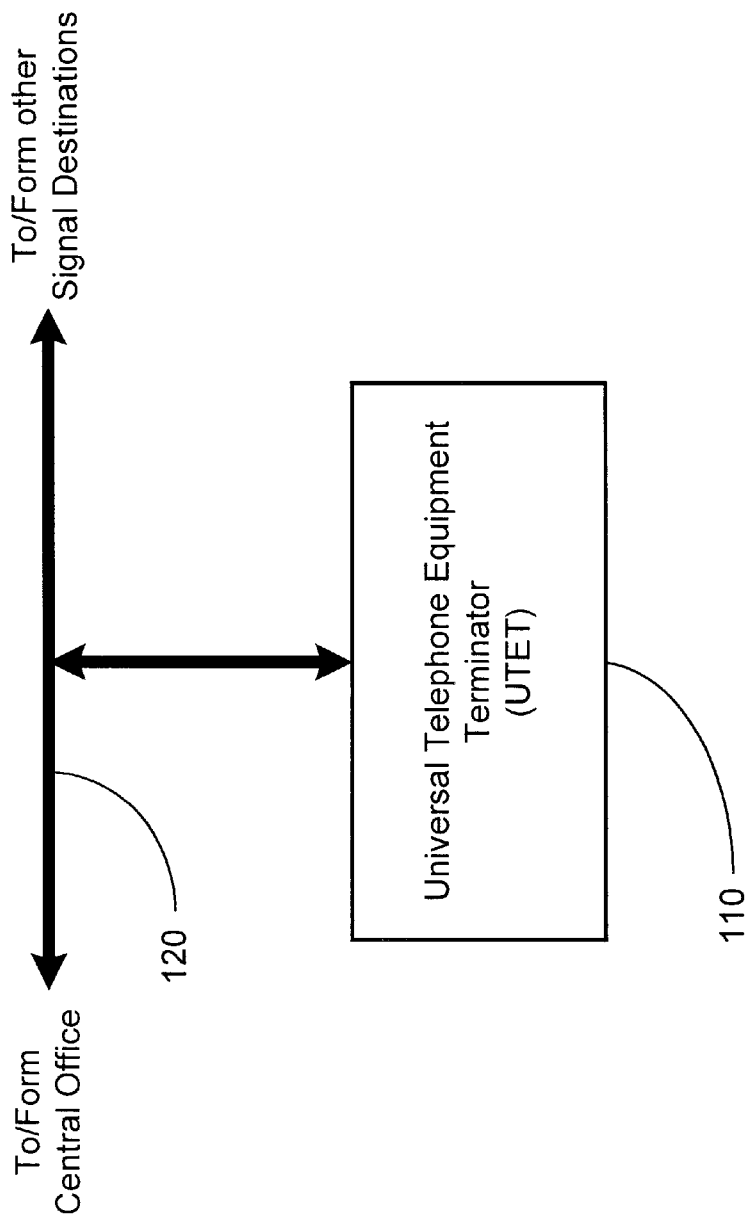
FIG. 1 is an illustration of one embodiment of the apparatus of the present invention, the Universal Telephone Equipment Terminator.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

To approach optimum operation of telecommunication infrastructure, periodic testing and calibration of the resources related to the infrastructure should be performed. Testing and calibration of telecommunication infrastructure, such as telephone lines, are also important when employing the telephone lines in innovative and non-traditional operating modes. Current telecommunication infrastructure can be utilized for other technology, such as networking multiple electronic devices within a building. Inspection for the viability of such network usage of telephone lines requires a series of tests described by the disclosure of the present invention. The present invention provides a method and an apparatus for testing the quality and integrity of communication lines, such as telephone lines. The apparatus described in the present invention can be controlled remotely, such as controlling the apparatus from a central location. The apparatus described in the present invention can also be controlled locally, such as from a computer, or it can be controlled by internal programming sequences.

Turning now to FIG. 1, one embodiment of the present invention, a universal telephone equipment terminator (UTET) 110, is illustrated. The UTET 110 is connected to a telephone signal line 120 and is capable of receiving and sending data. The UTET 110 is adapted to modify the characteristics of the telephone signal line 120, relating to a point of view from the telephone signal line 120 to the UTET 110. Generally, the location where the UTET 110 is placed is the point of the telephone line that is to be tested and characterized. In one embodiment, the telephone signal line 120 is a local loop capable of carrying ADSL and other DSL signals. The UTET 110 is used to test, characterize, and configure the telephone signal line 120 using several types of tests and other functions. The functions of the UTET 110 include automatically measuring off-hook impedance, measuring on-hook impedance, measuring line-voltage, implementing resistive-load termination, and implementing active impedance line-termination. In one embodiment, the UTET 110 is capable of configuring and testing a transmission line that is part of a local loop network. The UTET 110 is also capable of configuring and testing a transmission line that is part of a computer network, such as a local area network and a home network. In one embodiment, a home network interconnects a plurality of electronic devices with a confined area such as a single-family dwelling.

Figure 2:
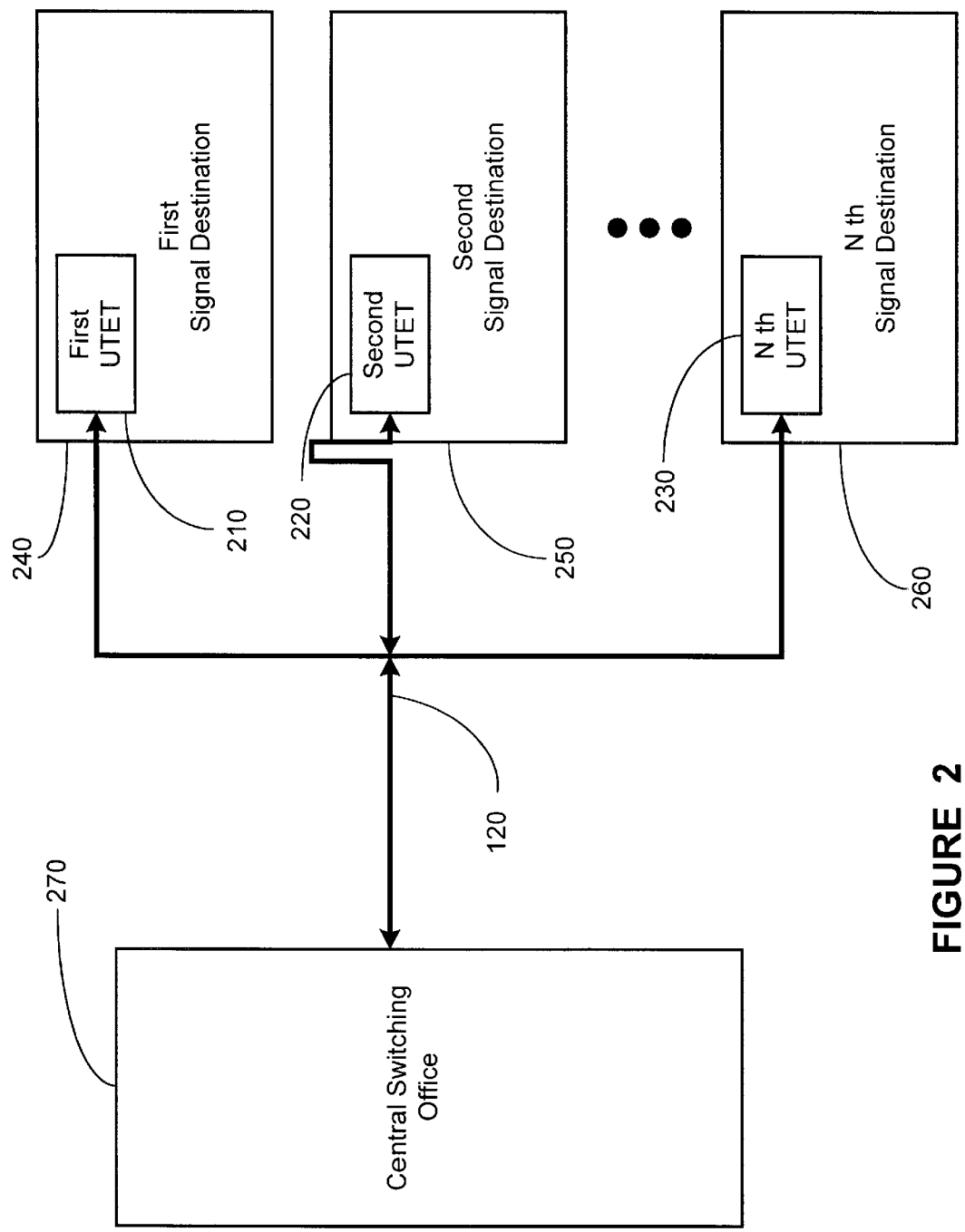
FIG. 2 illustrates one embodiment of an application of the present invention, within the context of a telephone signal line.

Turning now to FIG. 2, one embodiment of an application of the present invention is illustrated. The UTET 110, which is positioned on the telephone signal line 120, can be placed in a signal destination. As illustrated in FIG. 2, the first UTET 210, the second UTET 220, and the third UTET 230, are placed in the first through Nth signal destinations 240, 250, 260, respectively. In one embodiment, the first signal destination 240 is a subscriber resident unit, such as a single-family dwelling. The UTET 110 is coupled onto the telephone signal line 120, which carries signals from the central switching office 270 to the signal destinations 240, 250, 260.

In one embodiment, the testing and characterization of the telephone line, using the UTET 110, can be initiated and controlled from the central switching office 270. Control signals from the central switching office 270 can be sent to the UTET 110 over the telephone signal line 120. The UTET 110 can then enter one or more of its multiple test modes and test the telephone signal line 120. The UTET 110 can also test the telephone wiring (not shown) within the signal destinations 240, 250, 260. The UTET 110 can also be initiated and controlled locally, within the signal destinations 240, 250, 260.

Figure 3:
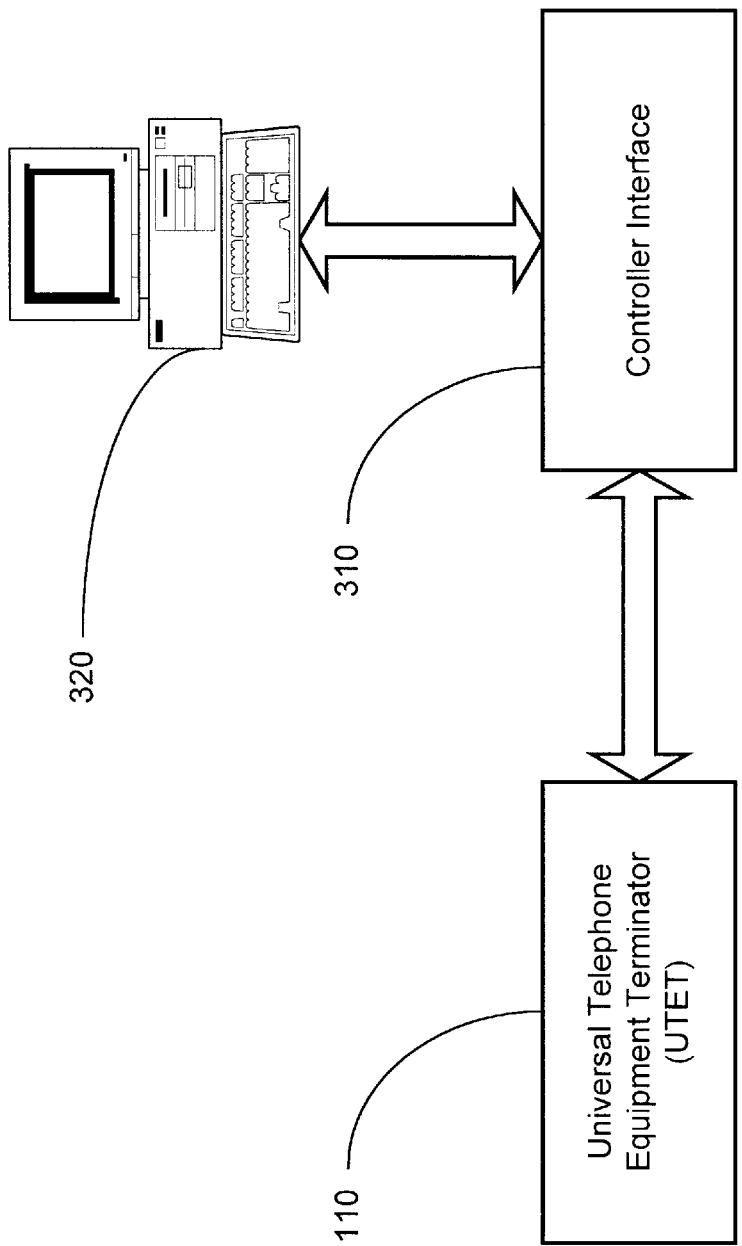
FIG. 3 illustrates one embodiment of the method for controlling the Universal Telephone Equipment Terminator locally, using a computer.

In one embodiment, the UTET 110 is controlled by a computer, located in the signal destinations 240, 250, 260. Turning now to FIG. 3, one embodiment of the method for controlling the UTET 110 locally using a computer is illustrated. The UTET 110 is coupled to a computer interface 310. In one embodiment, the computer interface 310 is an electronic device that is powered locally. In one embodiment, the computer interface 310 contains a data/command channel (not shown) from which information is received and transmitted through a modem. To facilitate communication between a computer system 320 and the UTET 110, the computer interface 310 sends and receives data to and from the computer system 320. In an alternative embodiment, the computer interface 310 is a printed circuit (PC) board that is connected to a port inside the computer system 320. The UTET 110 communicates with the computer system 320, and vice versa, through the computer interface 310. In one embodiment, the computer system 320 initiates the UTET 110 and controls its functions. The computer system 320 may be comprised of a Macintosh system, a UNIX system, a PC system, a VAX system, a Workstation system, or any other system employed by those skilled in the art.

Figure 4:
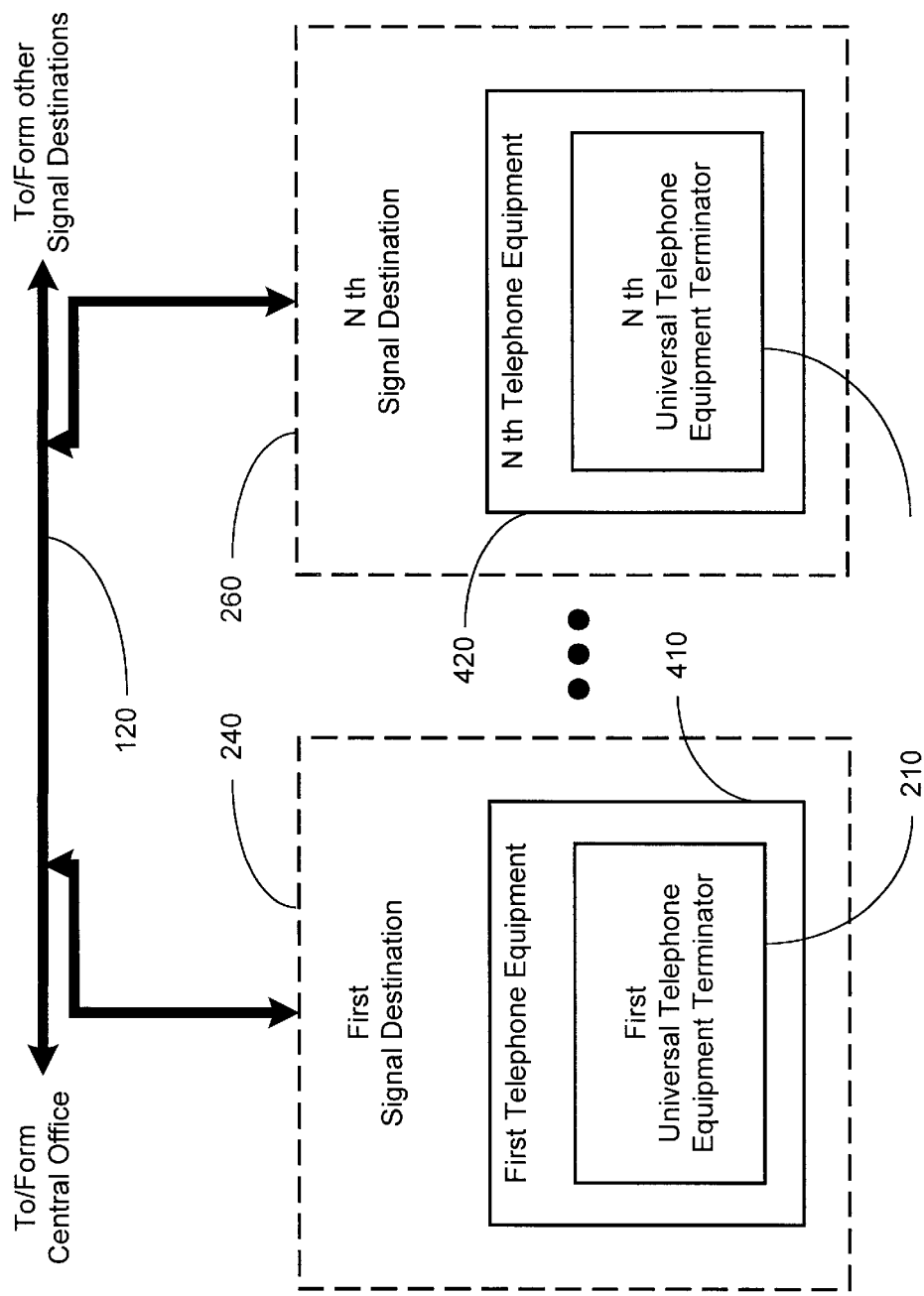
FIG. 4 illustrates a more detailed embodiment of the positioning of the Universal Telephone Equipment Terminator.

Turning now to FIG. 4, a more detailed embodiment of the present invention is illustrated. The first UTET 210 through the Nth UTET 230, are positioned within the first signal destination 240 through the Nth signal destination 260. In one embodiment, the first UTET 210 through the Nth UTET 230 are integrated with the first telephone equipment 410 through the Nth telephone equipment 420, which are located within the first signal destination 240 through the Nth signal destination 260. The present description is illustrated within the context of the first signal destination 240, but are applicable to all subsequent signal destinations (250 through 260). The first UTET 210 is capable of emulating the functions of the first telephone equipment 410 that is coupled to the first UTET 210. Using the first UTET 210, the integrity of the telephone line along the line path on the line path where the first telephone equipment 410 is located, can be examined.

Figure 5:
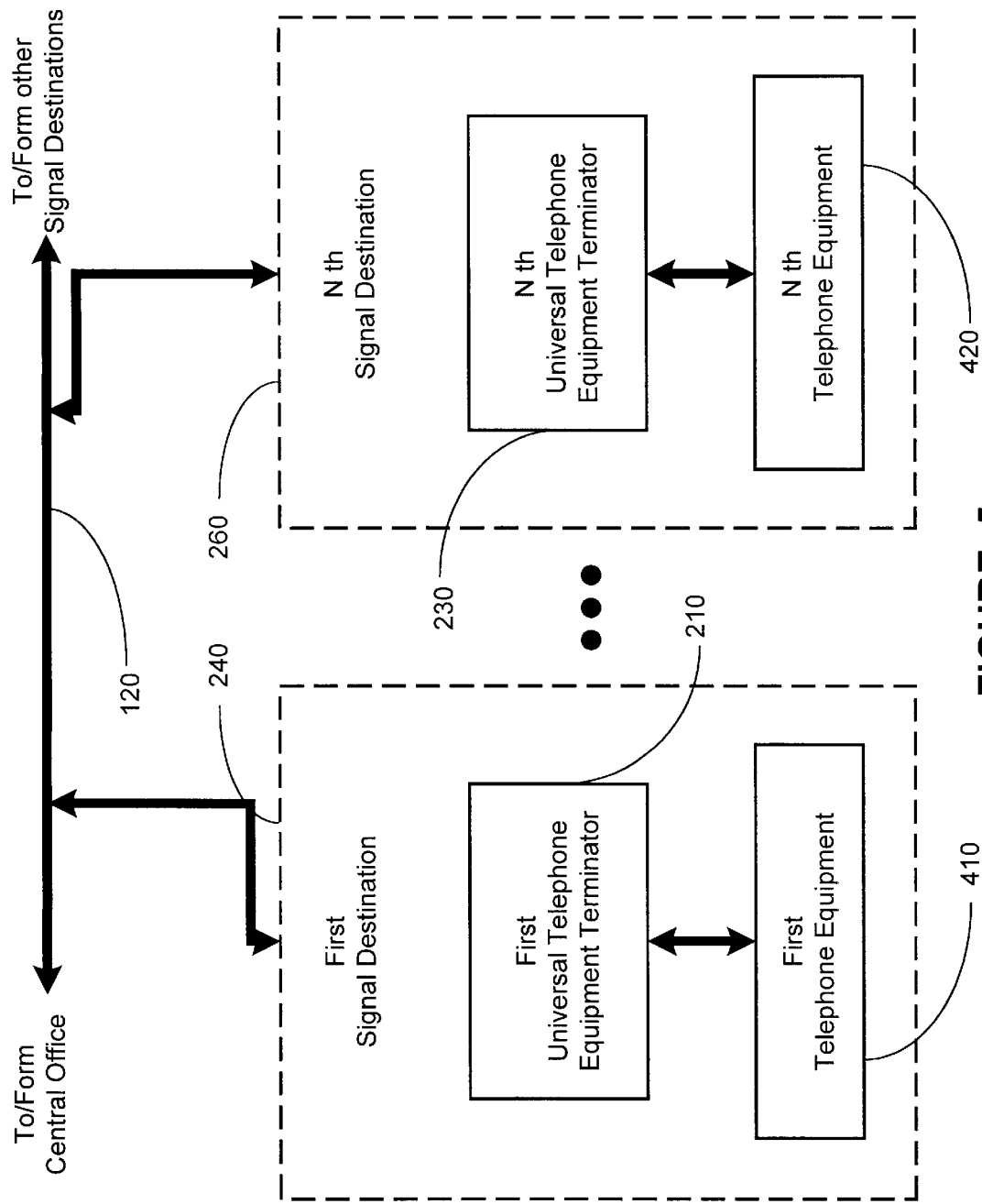
FIG. 5 illustrates a more detailed alternative embodiment of the positioning of the Universal Telephone Equipment Terminator.

In an alternative embodiment, the first UTET 210 is coupled to the first telephone equipment 410 externally, as shown in FIG. 5. Turning now to FIG. 5, the first UTET 210 is located in the first signal destination 240. In the embodiment presented in FIG. 5, the first UTET 210 is externally coupled to the first telephone equipment 410. Signals from the central switching office 270 are received from, and transmitted through, the first UTET 210 onto the first telephone equipment 410. Employing the present embodiment, the first UTET 210 is used to examine the integrity of the telephone line along a line path where the first telephone equipment 410 is located. The embodiment described in FIG. 4, wherein the first UTET 210 is coupled internally to the first telephone equipment 410, and the embodiment described in FIG. 5, wherein the UTET 210 is coupled externally to the first telephone equipment 410, generally function in a similar manner.

Figure 6:
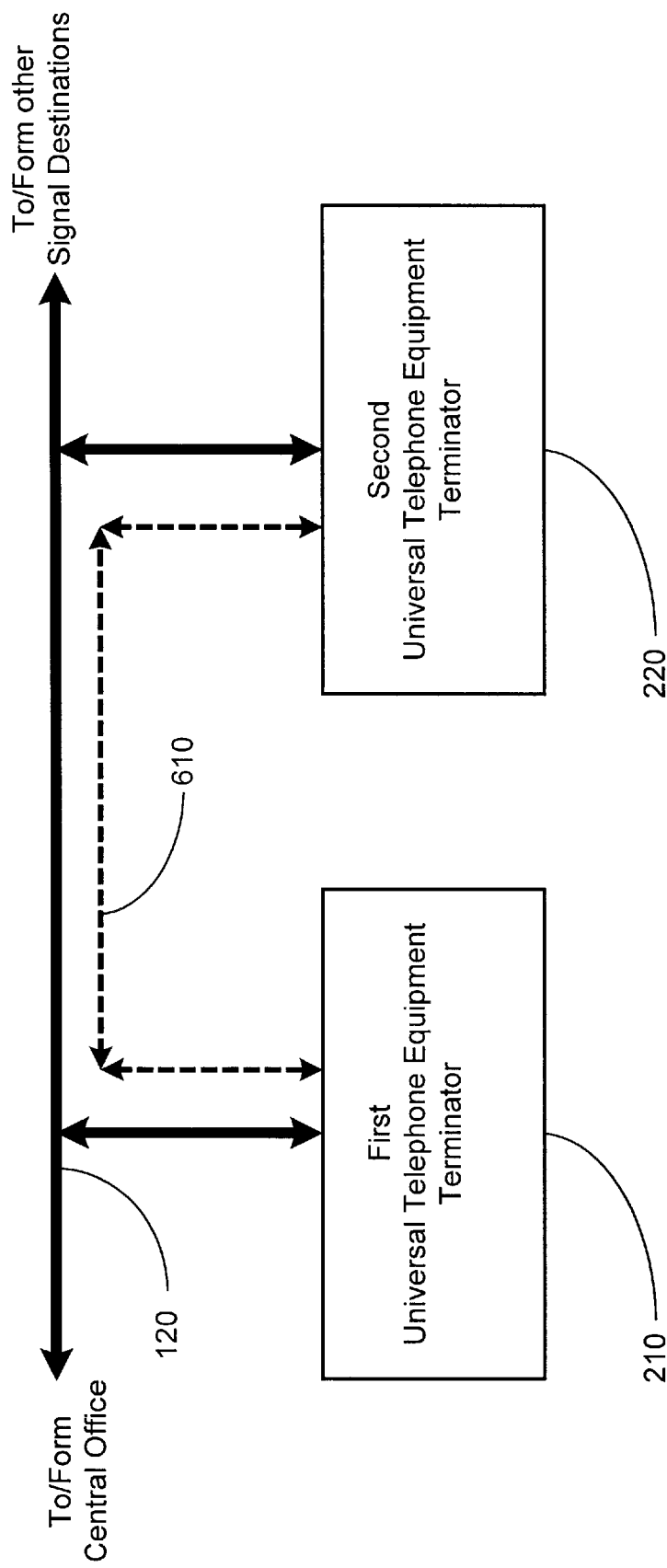
FIG. 6 illustrates a communication path between a first Universal Telephone Equipment Terminator and a second Universal Telephone Equipment Terminator.

In one embodiment, UTETs 110 are designed to communicate with each other. Turning now to FIG. 6, a communication path 610 between the first UTET 210 and the second UTET 220 is illustrated. As one example, a signal path test can be conducted on the first UTET 210 and the second UTET 220 at substantially the same time by sending test signals to the first UTET 210 and the first UTET 210 communicating with the second UTET 220. In one embodiment, the first UTET 210 and the second UTET 220 can send status and test signals to each other. The status signals and the result of the tests can be then sent back to the central switching office 270.

Figure 7:
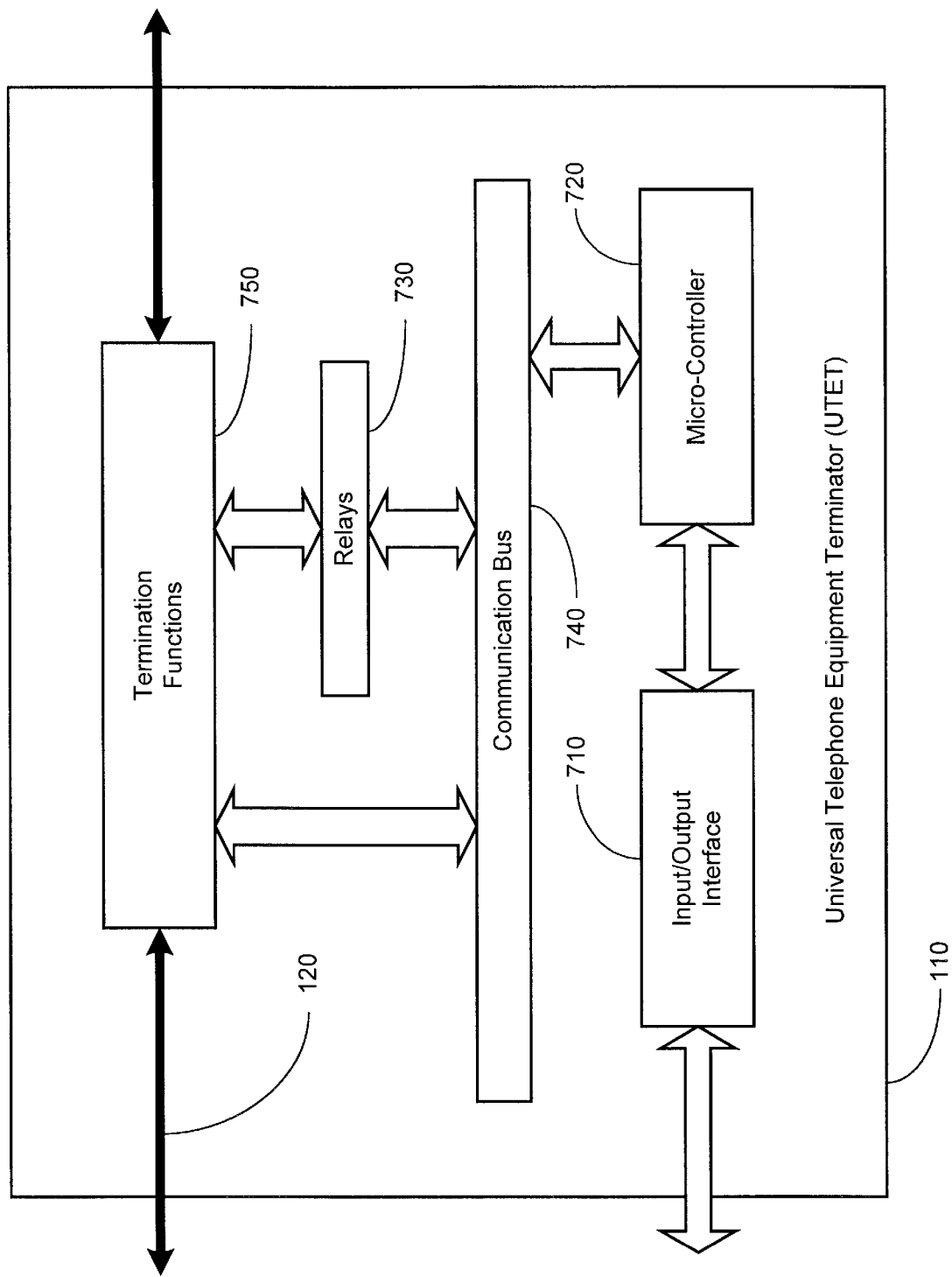
FIG. 7 depicts one illustration of the function block of a Universal Telephone Equipment Terminator.

One illustration of the function block of a UTET 110 is illustrated in FIG. 7. The UTET 110 communicates with the computer interface 310 though an input/output interface 710. The input/output interface 710 is capable of receiving and transmitting data and command signals. In one embodiment, the input/output interface 710 contains a slow, modem-type channel for receiving command and data signals over the telephone wire in one embodiment. The input/output interface 710 is capable of sending data to the computer system 320 through the computer interface 310.

The input/output interface 710 receives data and command signals from the computer system 320 through the computer interface 310.

The input/output interface 710 presents the data and command signals received from the computer interface 310 to a micro-controller 720. The micro-controller 720 processes the data and control signals received from the input/output interface 710 and directs the operation of the UTET 110 accordingly. Among its multiple functions, the micro-controller 720 controls the functions of relays 730. In one embodiment, the relays 730 are electromechanical devices that are capable of activating and de-activating several types of signal switches. In one embodiment, the relays 730 are controlled by the micro-controller 720 by sending signals through the communication bus 740. The relays 730 control multiple functions in the termination functions 750. The termination functions 750 are connected to the telephone signal line 120. Using the input/output interface 710, for control and monitoring, tests implemented by the termination functions 750 can be performed on the telephone signal line 120.

Figure 8:
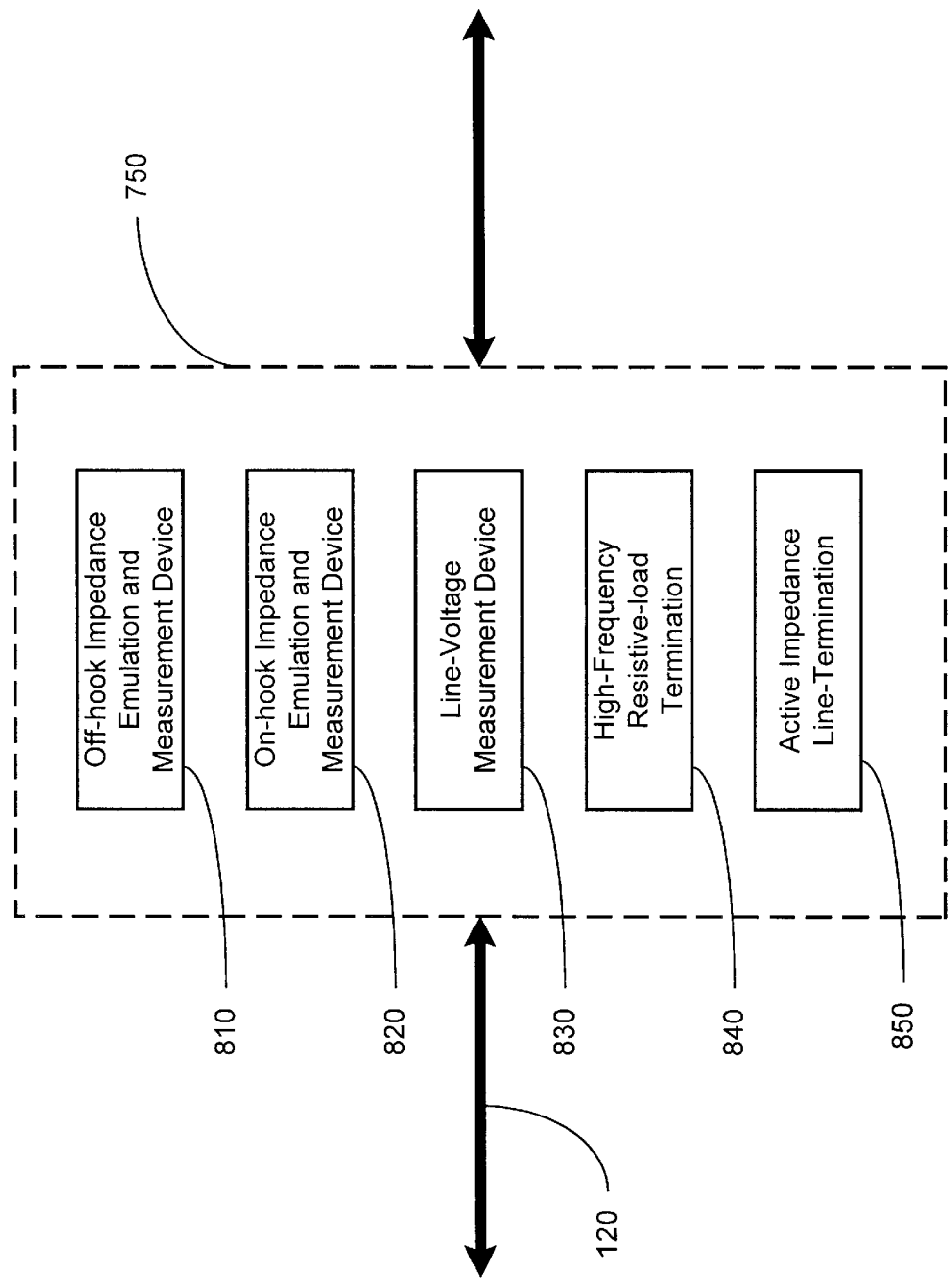
FIG. 8 illustrates a more detailed depiction of the termination functions described in FIG. 7.

Turning now to FIG. 8, a more detailed depiction of the termination functions 750 is illustrated. In one embodiment, the termination functions 750 includes an off-hook impedance emulation and measurement device 810, an on-hook impedance emulation and measurement device 820, a line-voltage measurement device 830, a high-frequency resistive-load termination 840, and an active impedance line-termination 850. The micro-controller 720 is capable of controlling and detecting the state of each of the terminations 810, 820, 830, 840, 850 and report back to the computer system 320, or to the central switching office 210. An operator can then test and analyze the behavior of the telephone signal line 120 based upon the states of the relays 730 that control the terminations 810, 820, 830, 840, 850 in the termination functions 750.

The off-hook impedance emulation and measurement device 810 allows the operator at a central switching office 270 to measure the line impedance on a particular section of the telephone signal line 120 in an off-hook mode, of the telephone equipment 410, 420. The on-hook impedance emulation and measurement device 820 allows the operator at a central switching office 270 to measure the line impedance on a particular section of the telephone signal line 120 in a on-hook mode of the telephone equipment 410, 420. The line-voltage measurement device 830 allows an operator at a central switching office 270 to measure the termination voltage at a particular point on the telephone signal line 120.

Figure 9:
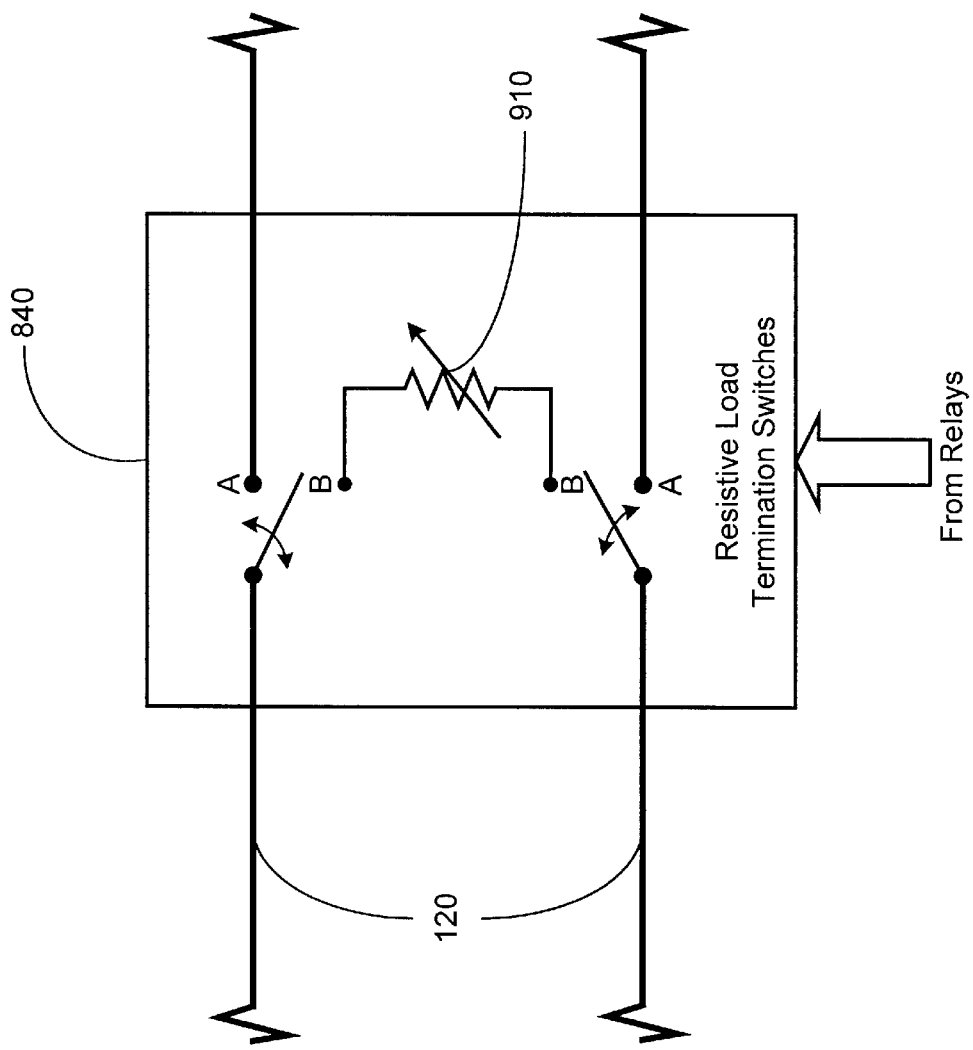
FIG. 9 illustrates resistive load switches described in FIG. 7 in further detail.

Turning now to FIG. 9, one embodiment of a high-frequency resistive-load termination 840 is illustrated. The relays 730 can activate the resistive load termination 840 to initiate the resistive termination on the telephone signal line 120. When the resistive load termination 840 is activated into position "A," the signal and ground wires in the telephone signal line 120 are connected straight through and function normally. When the resistive load termination 840 is activated into position "B," a resistive load 910 of a predetermined value is introduced onto the telephone signal line 120. The resistive load 910 terminates the signal and the ground wires of the telephone signal line 120.

In one embodiment, signal transmission problems, such as signal reflections, can be substantially reduced by applying a resistive termination onto the telephone signal line 120. Since the UTET 110 is portable, the resistive load termination 840 can be applied at virtually any point in the telephone signal line 120. In one embodiment, to reduce the effects of transmission line signal reflections, impedance matching principles, which are known by those skilled in the art, can be implemented by activating the resistive load termination 840.

The resistive load termination 840 can also be used to test the telephone signal line 120. The central switching office 270 can initiate the activation of the resistive load termination 840 at a predetermined point in the telephone signal line 120. The central switching office 270 can then measure the impedance of the telephone signal line 120 and determine whether a fault exists if the measured impedance does not match the predetermined value of the resistive load 910. Furthermore, the value of the resistive load 910 can be varied to extreme values so that the performance limitations of the telephone signal line 120 can be determined. For example, the value of the resistive load 910 can be reduced, approaching a short circuit termination, until the telephone signal line 120 essentially stops functioning. The last resistance value for which the telephone signal line 120 was functioning will be the lower limit of the resistive load termination value. Similarly, the value of the resistive load 910 can be increased, approaching an open circuit, until the telephone signal line 120 essentially stops functioning. The last resistance value for which the telephone signal line 120 was functioning will be the upper limit of the resistive load termination value. The upper and lower limits of the resistive load termination values can be used to determine the maximum and minimum transmission capabilities of the telephone signal line 120.

Figure 10:
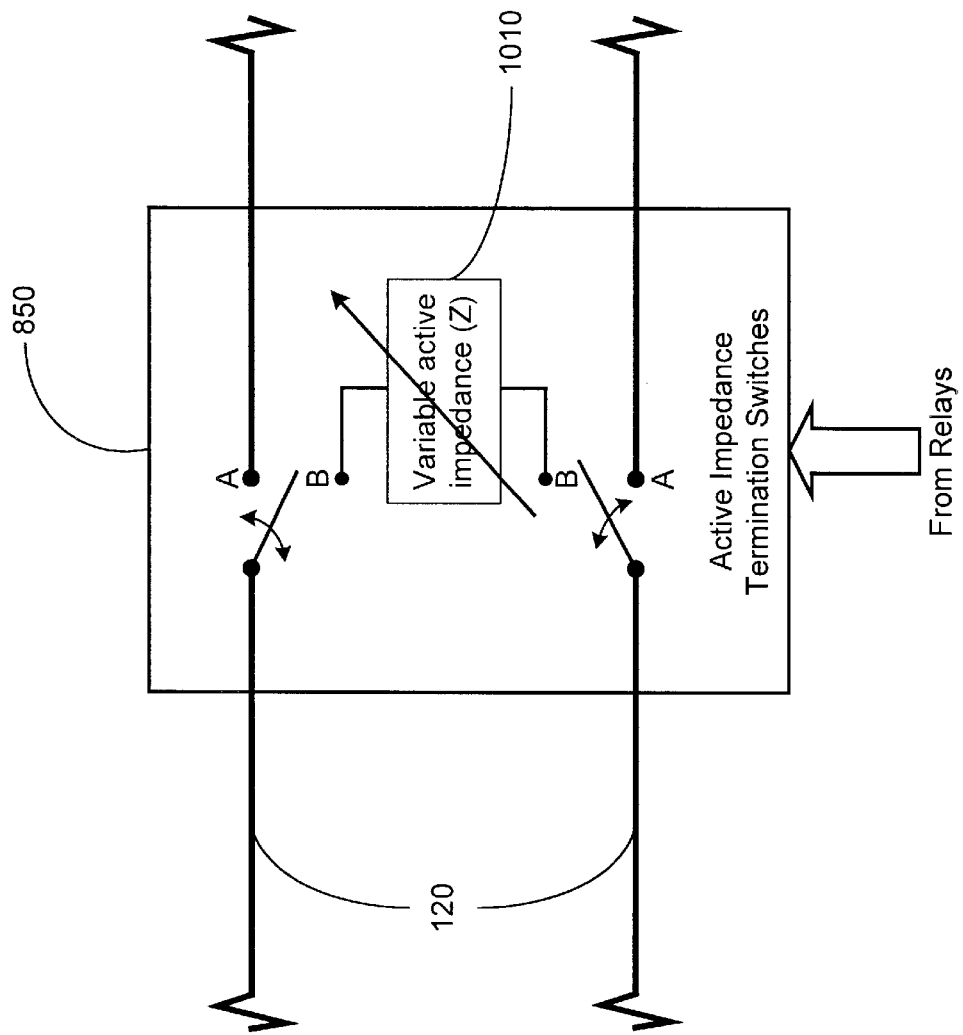
FIG. 10 illustrates the active impedance termination switches described in FIG. 7 in further detail.

Turning now to FIG. 10, one embodiment of an active impedance line-termination 850 is illustrated. The relays 730 can activate the active impedance termination 850 to initiate an active impedance termination load on the telephone signal line 120. The active impedance termination 850 can be placed in one of two positions: position "A" and position "B." When the active impedance termination 850 are activated into position "A," the signal and ground wires in the telephone signal line 120 are connected straight through and function normally. When the active impedance termination 850 are activated into position "B," the telephone signal line 120 is terminated with an impedance load 1010.

The termination of the telephone signal line 120 is achieved by placing a predetermined impedance between the signal and the ground wires in the telephone signal line 120. In position "B," the active impedance termination 850 introduce an impedance termination on the telephone signal line 120. In one embodiment, an active impedance load 1010 is primarily reactive impedance. The active impedance termination 850 on the telephone signal line 120 will allow the central switching office 270 to detect any reactance problems on the telephone signal line 120. Furthermore, in one embodiment, active impedance can be utilized to compensate for reactance problems on the telephone signal line 120. The active impedance termination 850 allows for the implementation of impedance matching solutions for reactance problems in the telephone signal line 120. Impedance matching solutions can be readily implemented into the telephone signal line 120 by those skilled in the art and have the benefit of the disclosure of the present invention.

Due to its effects on high frequency signals, active impedance termination may not be desirable when implementing an internal network application of the telephone signal line 120. Internal network applications include using the telephone signal line 120 at high frequencies, such as 7.5 MHz, to network multiple electronic devices within a signal destination 240, 250, 260. An example of an internal network application is networking a computer, a printer, a fax machine, a copier, the air conditioner controls, the refrigerator, and the security alarm system, within a signal destination 240, 250, 260.

In one embodiment, the active impedance termination is utilized to improve telephone voice signals. However, active impedance termination may interfere with high frequency signals used for internal networking. The UTET 110 can activate the active impedance termination 850 to implement the active impedance termination load during voice communications by activating the active impedance termination switches 470 to position "B." The UTET 110 can de-activate the active impedance termination 850 to substantially reduce the active impedance termination during internal networking applications by placing the active impedance termination 850 to position "A." Therefore, by manipulating the active impedance termination 850, the UTET 110 can be operated as a multi-configuration switch, which allows operation of the telephone signal line 120 as a normal telephone carrier, including as a DSL signal carrier, and as an internal network signal carrier.

In one embodiment, an external source, such as the central switching office 270 or a computer system 320 can use the input/output interface 710 and the micro-controller 720 to control the termination functions 750 in the UTET 110. In one embodiment, a plurality of the terminations 810, 820, 830, 840, 850 can be used in a variety of combinations. The installation of the UTET 110 in remote locations, whether in serial connection with a telephone equipment 410, 420 or placed within a telephone equipment 410, 420, allows the central switching office 270 to have the capability to thoroughly test, qualify, and troubleshoot telephone signal lines 120 without significant manual efforts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus for improving transmission quality on a transmission line by testing or evaluating and configuring the transmission line, comprising a Universal Telephone Equipment Terminator (UTET) capable of implementing at least one of a test and an emulation, as well as a configuration on said transmission line, wherein the configuration is performed in response to the test or the emulation, wherein said Universal Telephone Equipment Terminator further comprises:

an input/output interface capable of receiving data and command signals;

a micro-controller electrically coupled to said input/output interface, said micro-controller being adapted to receive and process said data and command signals from said input/output interface;

at least one relay electrically coupled to said micro-controller, said relay being adapted to activate a plurality of signal switches in response to a set of commands from said micro-controller;

at least one off-hook impedance emulation and measurement device electrically coupled to said relay and said transmission line, said off-hook impedance emulation and measurement device adapted to be activated by said relay;

at least one-hook impedance emulation and measurement device electrically coupled to said relay and said transmission line, said on-hook impedance emulation and measurement device adapted to be activated by said relay;

at least one line-voltage measurement device electrically coupled to said relay and said transmission line, said line-voltage measurement device adapted to be activated by said relay;

at least one resistive load termination switch electrically coupled to said relay and said transmission line, said resistive load termination switch adapted to be activated by said relay; and at least one active impedance termination switch electrically coupled to said relay and said transmission line, said active impedance termination switch adapted to be activated by said relay.

2. The apparatus of claim 1, wherein said transmission line is a communication line for a network.

3. The apparatus of claim 2, wherein said network is a computer network.

4. The apparatus of claim 3, wherein said computer network is a home network capable of electronically linking a plurality of electronic devices.

5. The apparatus described in claim 1, wherein said input/output interface further comprises:

a slow command channel for receiving command signals; and a modem-type channel for receiving data signals.

6. The apparatus described in claim 1, wherein said relay is an electromechanical device capable of activating said signal switches.

7. The apparatus described in claim 1, wherein said off-hook impedance emulation and measurement device is capable of measuring an off-hook impedance on said transmission line.

8. The apparatus described in claim 1, wherein said on-hook impedance emulation and measurement device is capable of measuring an on-hook impedance on said transmission line.

9. The apparatus described in claim 1, wherein said line-voltage measurement device is capable of measuring a line voltage on-a transmission line.

10. The apparatus described in claim 1, wherein said resistive load termination switch is capable of:

entering a normal operation mode, wherein said transmission line is not altered; and entering an active mode, wherein said resistive load termination switch is capable of terminating a signal wire and a ground wire of said transmission line with a predetermined resistive load value.

11. The apparatus described in claim 1, wherein said active impedance termination switch is capable of:

entering a normal operation mode, wherein said transmission line is not altered; and entering an active mode, wherein said active impedance termination switch is capable of terminating a signal wire and a ground wire of said transmission line with an active impedance load.

12. The apparatus described in claim 11, wherein said active impedance load is primarily a reactive load.

13. The apparatus described in claim 1, wherein said Universal Telephone Equipment Terminator is coupled to a transmission line that is coupled to a central switching office capable of transmitting commands and data to said network interface device.

14. The apparatus described in claim 13, wherein said transmission line is a telephone local loop.

15. The apparatus described in claim 13, wherein said transmission line is a network communication loop.

16. The apparatus described in claim 15, wherein said transmission line is a home network communication loop.

17. The apparatus described in claim 13, wherein said Universal Telephone Equipment Terminator is externally coupled to a telephone equipment.

18. The apparatus described in claim 13, wherein said Universal Telephone Equipment Terminator is internally coupled within a telephone equipment.

19. The apparatus described in claim 1, wherein said Universal Telephone Equipment Terminator is coupled to a computer interface that is electrically connected to a computer system, said computer system being capable of transmitting commands and data to said network interface device.

20. The apparatus described in claim 1, further configured to communicate status and test signals to a second one of said apparatus.

21. The apparatus described in claim 20, wherein the second one of said apparatus is substantially identical to the apparatus.

22. The apparatus described in claim 20, wherein either the apparatus or the second one of said apparatus is further configured to test, evaluate, and configure the transmission line between the apparatus and the second one of said apparatus.

23. The apparatus described in claim 22, wherein both the apparatus and the second one of said apparatus are further configured to test, evaluate, and configure the transmission line between the apparatus and the second one of said apparatus.

24. The apparatus described in claim 1, further configured to communicate status and test results to a central office for the second one of said apparatus.

25. The apparatus described in claim 22, wherein said Universal Telephone Equipment Terminator is coupled to a computer interface that is electrically connected to a computer system, said computer system being capable of transmitting commands and data to said network interface device.

26. A method for testing, configuring, and evaluating a transmission line, comprising:
    receiving a set of command and data signals through an input/output interface;
    processing said command and data signals from said input/output interface for controlling at least one relay;
    activating at least one switch for testing and improving a transmission signal line using said relay;
    testing and emulating said transmission signal line based upon said activated switch; and configuring said transmission signal line based upon said testing and emulating.

27. The method as described in claim 26, wherein processing said command and data signals further comprises processing said command and data signals using a micro-controller.

28. The method as described in claim 27, wherein processing said command and data signals using a micro-controller further comprises said micro-controller driving said relay.

29. The method as described in claim 26, wherein said testing and emulating said transmission signal line further comprises activating at least one off-hook impedance emulation and measurement device for measuring an impedance on said transmission signal line.

30. The method as described in claim 26, wherein said testing and emulating said transmission signal line further comprises activating at least one on-hook impedance emulation and measurement device for measuring an impedance on said transmission signal line.

31. The method as described in claim 26, wherein said testing and emulating said transmission signal line further comprises activating at least one line-voltage measurement device for measuring a line voltage on said transmission signal line.

32. The method as described in claim 26, wherein said configuring said transmission signal line further comprises activating at least one resistive load termination circuit switch for introducing a resistive load on said transmission signal line.

33. The method as described in claim 26, wherein said configuring said transmission signal line further comprises activating at least one active impedance termination circuit switch for introducing an active impedance load on said transmission signal line.

34. The method as described in claim 33, wherein introducing an active impedance load further comprises introducing an active impedance load that is primarily a reactive load.

35. The method as described in claim 26, further comprising:
    communicating status and test signals on said transmission line to a different apparatus also configured to perform the method.

36. An apparatus for testing, configuring, and evaluating a transmission line, comprising:
    means for receiving a set of command and data signals through an input/output interface;
    means for processing said command and data signals from said input/output interface for controlling a set of relays;
    means for activating one or more switches for testing and improving a transmission signal line using said relays;
    means for testing and emulating said transmission signal line based upon said activated switches; and
    means for configuring said transmission signal line based upon a result of said means for testing and emulating.

37. The apparatus as described in claim 36, further comprising:
    means for communicating status and test signals on said transmission line to a different one of the apparatus.

38. An apparatus for testing, evaluating, and configuring a transmission line to improve transmission quality on said transmission line, comprising a Universal Telephone Equipment Terminator (UTET) capable of implementing at least two of a test, a configuration, and an emulation on said transmission line, configured to communicate status and test signals on said transmission line to a second one of said apparatus, wherein the configuration is performed in response to the test or the emulation, wherein said Universal Telephone Equipment Terminator further comprises:
    an input/output interface capable of receiving data and command signals;
    a micro-controller electrically coupled to said input/output interface, said micro-controller being adapted to receive and process said data and command signals from said input/output interface;
    at least one relay electrically coupled to said micro-controller, said relay being adapted to activate a plurality of signal switches in response to a set of commands from said micro-controller;

at least one off-hook impedance emulation and measurement device electrically coupled to said relay and said transmission line, said off-hook impedance emulation and measurement device adapted to be activated by said relay;

at least one on-hook impedance emulation and measurement device electrically coupled to said relay and said transmission line, said on-hook impedance emulation and measurement device adapted to be activated by said relay;

at least one line-voltage measurement device electrically coupled to said relay and said transmission line, said line-voltage measurement device adapted to be activated by said relay;

at least one resistive load termination switch electrically coupled to said relay and said transmission line, said resistive load termination switch adapted to be activated by said relay; and at least one active impedance termination switch electrically coupled to said relay and said transmission line, said active impedance termination switch adapted to be activated by said relay.

39. The apparatus described in claim 38, wherein said input/output interface further comprises:

a slow command channel for receiving command signals; and a modem-type channel for receiving data signals.

40. The apparatus described in claim 38, wherein said relay is an electromechanical device capable of activating said signal switches.

41. The apparatus described in claim 38, wherein said off-hook impedance emulation and measurement device is capable of measuring an off-hook impedance on said transmission line.

42. The apparatus described in claim 38, wherein said on-hook impedance emulation and measurement device is capable of measuring an on-hook impedance on said transmission line.

43. The apparatus described in claim 38, wherein said line-voltage measurement device is capable of measuring a line voltage on a transmission line.

44. The apparatus described in claim 38, wherein said resistive load termination switch is capable of:

entering a normal operation mode, wherein said transmission line is not altered; and entering an active mode, wherein said resistive load termination switch is capable of terminating a signal wire and a ground wire of said transmission line with a predetermined resistive load value.

45. The apparatus described in claim 44, wherein entering the active mode is comprised in the configuration on the transmission line.

46. The apparatus described in claim 38, wherein said active impedance termination switch is capable of:

entering a normal operation mode, wherein said transmission line is not altered; and entering an active mode, wherein said active impedance termination switch is capable of terminating a signal wire and a ground wire of said transmission line with an active impedance load.

47. The apparatus described in claim 46, wherein entering the active mode is comprised in the configuration on the transmission line.

48. The apparatus described in claim 46, wherein said active impedance load is primarily a reactive load.

49. The apparatus described in claim 38, wherein said Universal Telephone Equipment Terminator is coupled to a transmission line that is coupled to a central switching office capable of transmitting commands and data to said network interface device.

50. The apparatus described in claim 49, wherein said transmission line is a telephone local loop.

51. The apparatus described in claim 49, wherein said transmission line is a network communication loop.

52. The apparatus described in claim 51, wherein said transmission line is a home network communication loop.

53. The apparatus described in claim 49, wherein said Universal Telephone Equipment Terminator is externally coupled to a telephone equipment.

54. The apparatus described in claim 49, wherein said Universal Telephone Equipment Terminator is internally coupled within a telephone equipment.

55. The apparatus described in claim 38, wherein said transmission line is a communication line for a network.

56. The apparatus described in claim 55, wherein said network is a computer network.

57. The apparatus described in claim 56, wherein said computer network is a home network capable of electronically linking a plurality of electronic devices.

* * * * *